(12) United States Patent
Verwoerd

(10) Patent No.: US 8,336,890 B2
(45) Date of Patent: Dec. 25, 2012

(54) ANNULAR-GAP SEAL FOR A VALVE

(75) Inventor: Gerrit H. Verwoerd, Snelrewaard (NL)

(73) Assignee: Mokveld Valves B.V., Gouda (NL)

( * ) Notice: Subject to any disclaimer, the term of this patent is extended or adjusted under 35 U.S.C. 154(b) by 1071 days.

(21) Appl. No.: 10/550,133

(22) PCT Filed: Mar. 16, 2004

(86) PCT No.: PCT/EP2004/002704
§ 371 (c)(1),
(2), (4) Date: Oct. 26, 2005

(87) PCT Pub. No.: WO2004/083691
PCT Pub. Date: Sep. 30, 2004

(65) Prior Publication Data
US 2006/0202428 A1    Sep. 14, 2006

(30) Foreign Application Priority Data

Mar. 21, 2003  (DE) .................................. 103 12 753

(51) Int. Cl.
*F16J 15/02*  (2006.01)
(52) U.S. Cl. ........................................ 277/643
(58) Field of Classification Search .................. 277/434, 277/435, 438, 472, 489, 491, 603, 606, 608, 277/609, 616, 630, 637, 639, 643; 251/172, 251/175; 137/219
See application file for complete search history.

(56) References Cited

U.S. PATENT DOCUMENTS

| | | | | | |
|---|---|---|---|---|---|
| 2,859,061 | A | * | 11/1958 | Reid | 277/434 |
| 3,642,248 | A | * | 2/1972 | Benware | 251/172 |
| 3,765,440 | A | * | 10/1973 | Grove et al. | 137/246.22 |
| 3,790,123 | A | * | 2/1974 | Grove et al. | 251/31 |
| 5,354,072 | A | * | 10/1994 | Nicholson | 277/647 |

FOREIGN PATENT DOCUMENTS

| | | |
|---|---|---|
| DE | 29 29 389 | 2/1981 |
| DE | 37 31 349 | 3/1989 |
| FR | 1391410 | 3/1965 |

* cited by examiner

*Primary Examiner* — Gilbert Lee
(74) *Attorney, Agent, or Firm* — Collard & Roe, P.C.

(57) ABSTRACT

An annular-gap seal for a valve, blocks the fluid flow from a high-pressure side to a low-pressure side. The valve has a cylinder, through which the fluid flows and in which a piston is axially displaced. In the blocked position, an annular gap between the piston and the cylinder can be sealed by the annular gap seal, which lies in a groove that runs around the cylinder. To increase the sealing action of the gap seal, two sealing rings lie adjacent to one another mirror-symmetrically in the groove. In the blocked position, fluid from the high-pressure side causes a sealing lip of a first sealing ring that faces the low-pressure side to be pressed in a fluid-tight manner against the piston and a sealing face of the first sealing ring to be pressed in a fluid-tight manner against the wall of the groove.

6 Claims, 4 Drawing Sheets

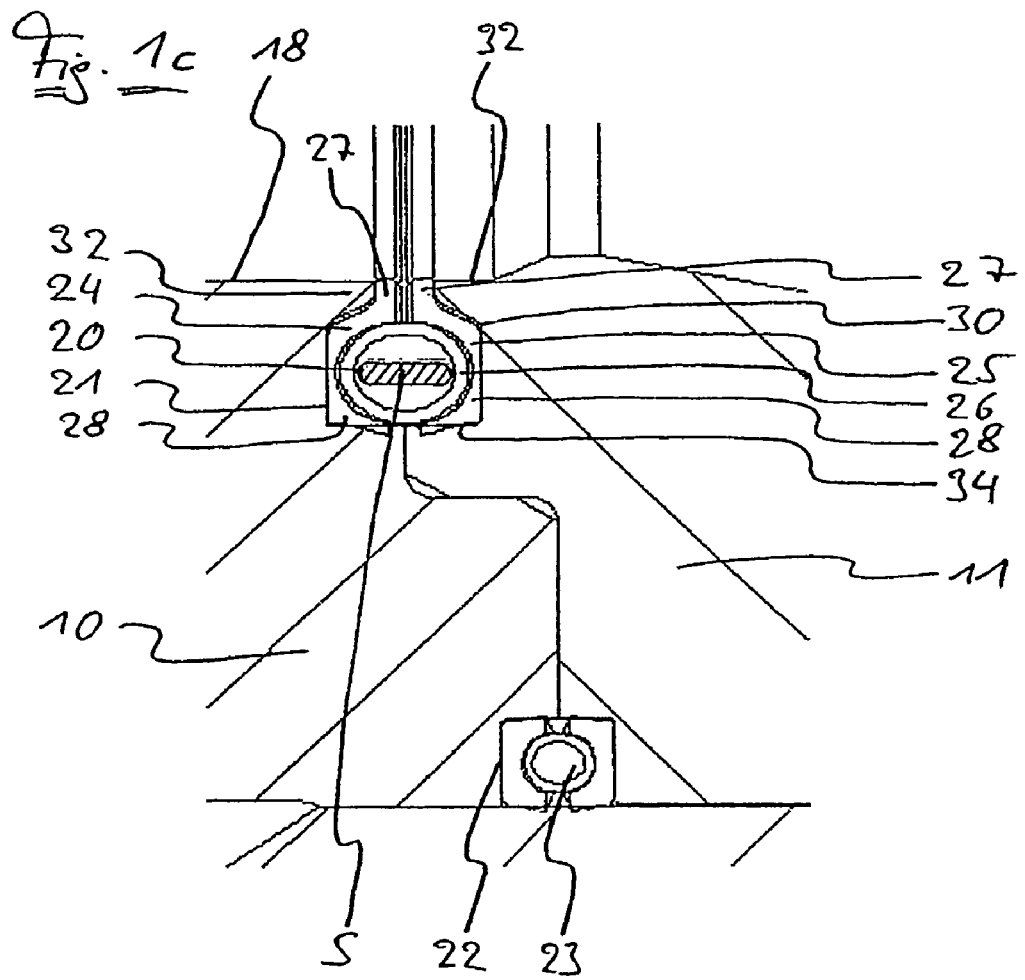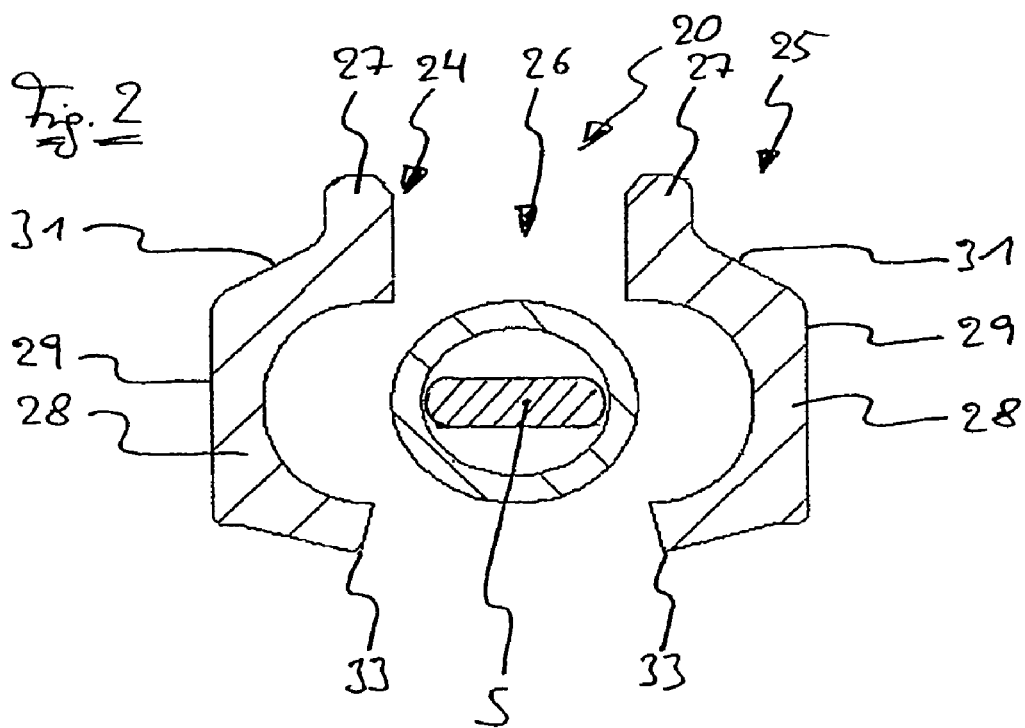

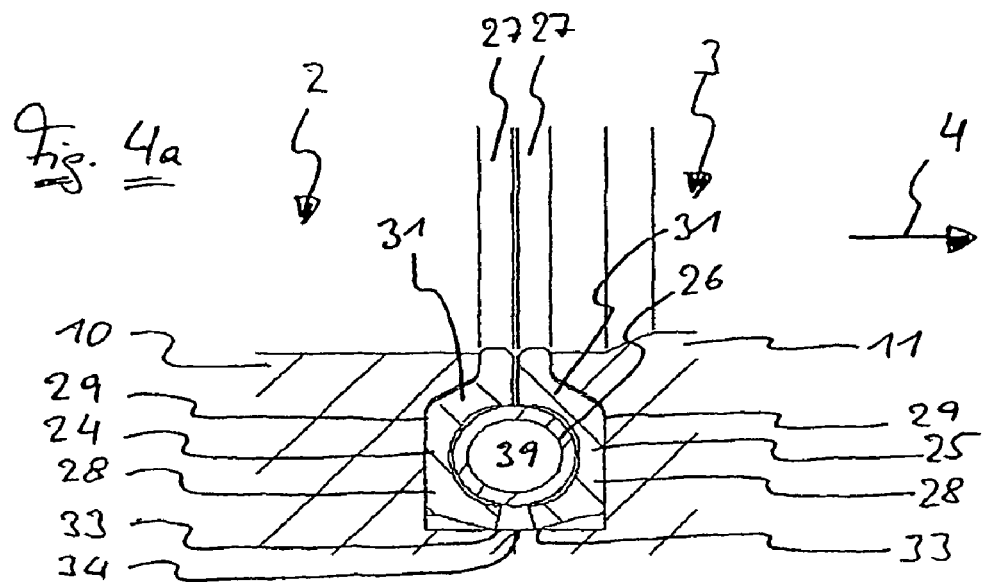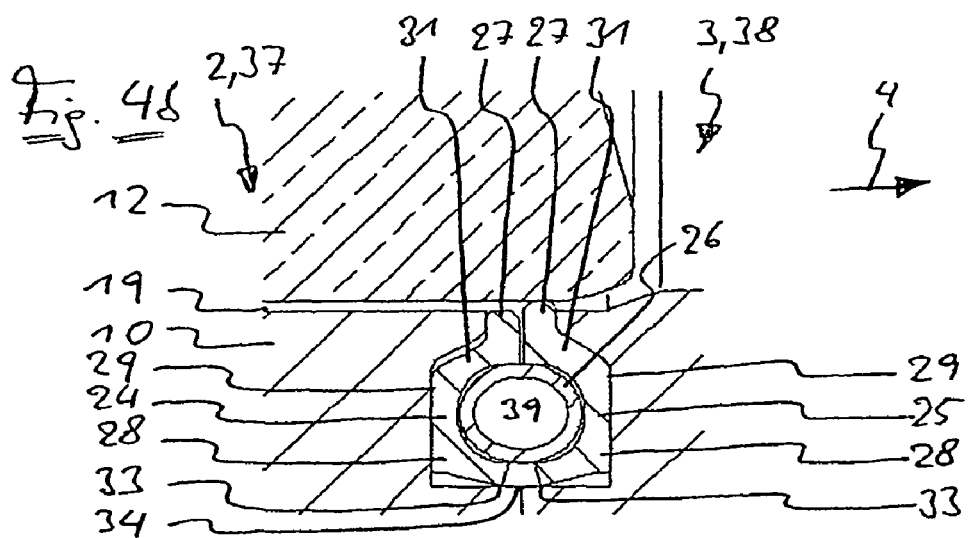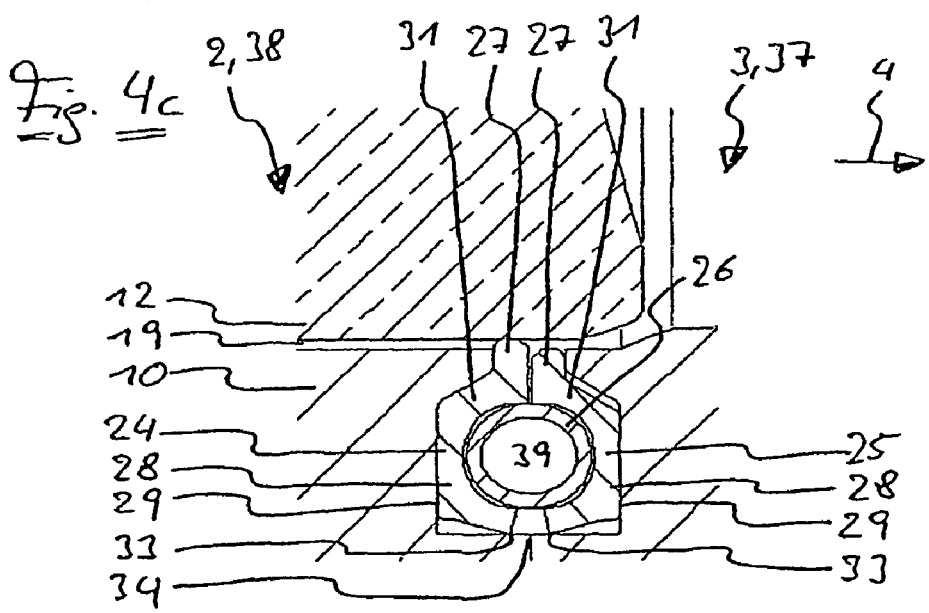

ANNULAR-GAP SEAL FOR A VALVE

CROSS REFERENCE TO RELATED APPLICATIONS

Applicant claims priority under 35 U.S.C. §119 of German Application No. 103 12 753.4 filed on Mar. 21, 2003. Applicants also claim priority under 35 U.S.C. §365 of PCT/EP04/02704 filed on Mar. 16, 2004.

BACKGROUND OF THE INVENTION

The present invention relates to an annular gap seal for a valve, which may block while in a blocked position the flow of a fluid from a high-pressure side to a low-pressure side of the valve, the valve having a cylinder which the fluid may flow through and in which a piston is axially displaceable, and an annular gap between the piston and the cylinder being sealable in the blocked position using the annular gap seal, which lies in a groove around the circumference of the cylinder.

Annular gap seals of this type for valves are generally known. German patent DE 37 31 349 A1 discloses a trapezoidal annular gap seal, for example, lying in a trapezoidal groove and which may be placed under a pre-tension using a lock washer. German patent DE 29 29 389 A1 discloses a regulating valve, in which an annular gap seal of this type is typically used.

The known annular gap seals have leakage flows in the blocked position, which are tolerated less and less for reasons of quality assurance in industrial production and control processes. The causes of these leakage flows are (1) the occurrence of wear and aging on the seal elements, (2) insufficient radial adjustment capability of the known annular gap seals and (3) inadequate consistency of their material properties upon changes of the operating temperature.

In addition, the known annular gap seals—precisely because of the leakage flows—are only capable of securing facility parts from backflows in a very limited way.

SUMMARY OF THE INVENTION

The object of the present invention is to provide an annular gap seal which ensures tightness both in the intended flow direction and also opposite the intended flow direction and, for this purpose, particularly minimizes the leakage flows, even at different operating temperatures.

This object is achieved according to the present invention by two sealing rings positioned mirror-symmetrically in the groove next to one another, a sealing lip of a first sealing ring facing toward the low-pressure side being able to be pressed fluid-tight against the piston, and a sealing surface of the first sealing ring being able to be pressed fluid-tight against a groove wall in the blocked position by the fluid from the high-pressure side.

Design optimization is possible as a result of the division of the annular gap seal into two sealing rings. This allows for a self-reinforcement effect of the sealing action upon increasing pressure differential between the high-pressure side and the low pressure side. Through the symmetrical design, the annular gap seal according to the present invention acts equally effectively in the intended flow direction and opposite the intended flow direction.

This annular gap seal is preferably designed in such a way that while in the blocked position, a sealing shoulder of the first sealing ring facing toward the low-pressure side may be pressed fluid-tight against a peripheral lug, which projects axially into the groove, by the fluid from the high-pressure side. The pairing of a sealing shoulder with a peripheral lug in the groove ensures a further elevated sealing action between the sealing ring and the groove wall on the valve housing.

The sealing rings of the annular gap seal have C-profiles and the C-profile of the first sealing ring facing toward the low-pressure side is expandable in the blocked position by the fluid from the high-pressure side. Through the expansion, the sealing ring of the annular gap seal is additionally clamped between the groove base and the mantle surface of the piston, through which the sealing action between sealing ring and groove base—i.e., housing—and mantle is further elevated.

Oversized dimensions of the annular gap seal in relation to the distance between piston and groove base are also used for increasing the sealing action, so that the annular gap seal may be laid in the groove with pre-tension.

In an another preferred embodiment, the annular gap seal has a stabilizing element, which may be laid in the direction of the groove with the sealing rings. Such a stabilizing element is preferably made of a material whose properties are subjected to extremely slight variations in the scope of the operating temperatures. In manifold applications, steel has particularly proven itself as a material whose aging and media resistance may additionally be increased by different alloys in a generally known way and adapted to the requirements.

The stabilizing element is preferably a coiled spring which may be inserted in a torus shape. The coiled spring particularly allows the sealing lips of the sealing rings to be pretensioned in the direction of the piston.

BRIEF DESCRIPTION OF THE DRAWINGS

Other objects and features of the present invention will become apparent from the following detailed description considered in connection with the accompanying drawings. It is to be understood, however, that the drawings are designed as an illustration only and not as a definition of the limits of the inventions.

The present invention will be explained in the following on the basis of an exemplary embodiment.

FIG. 1c shows the narrower environment of the annular gap seal in this valve, FIG. 2 shows an exploded sectional illustration of the annular gap seal, FIG. 4a shows a detail view of the annular gap seal with an open valve, FIG. 4b shows this detail view in the blocked position under normal pressure conditions and FIG. 4c shows this detail view in the blocked position with flow against the intended flow direction.

DETAILED DESCRIPTION OF THE PREFERRED EMBODIMENTS

Figure 1A:
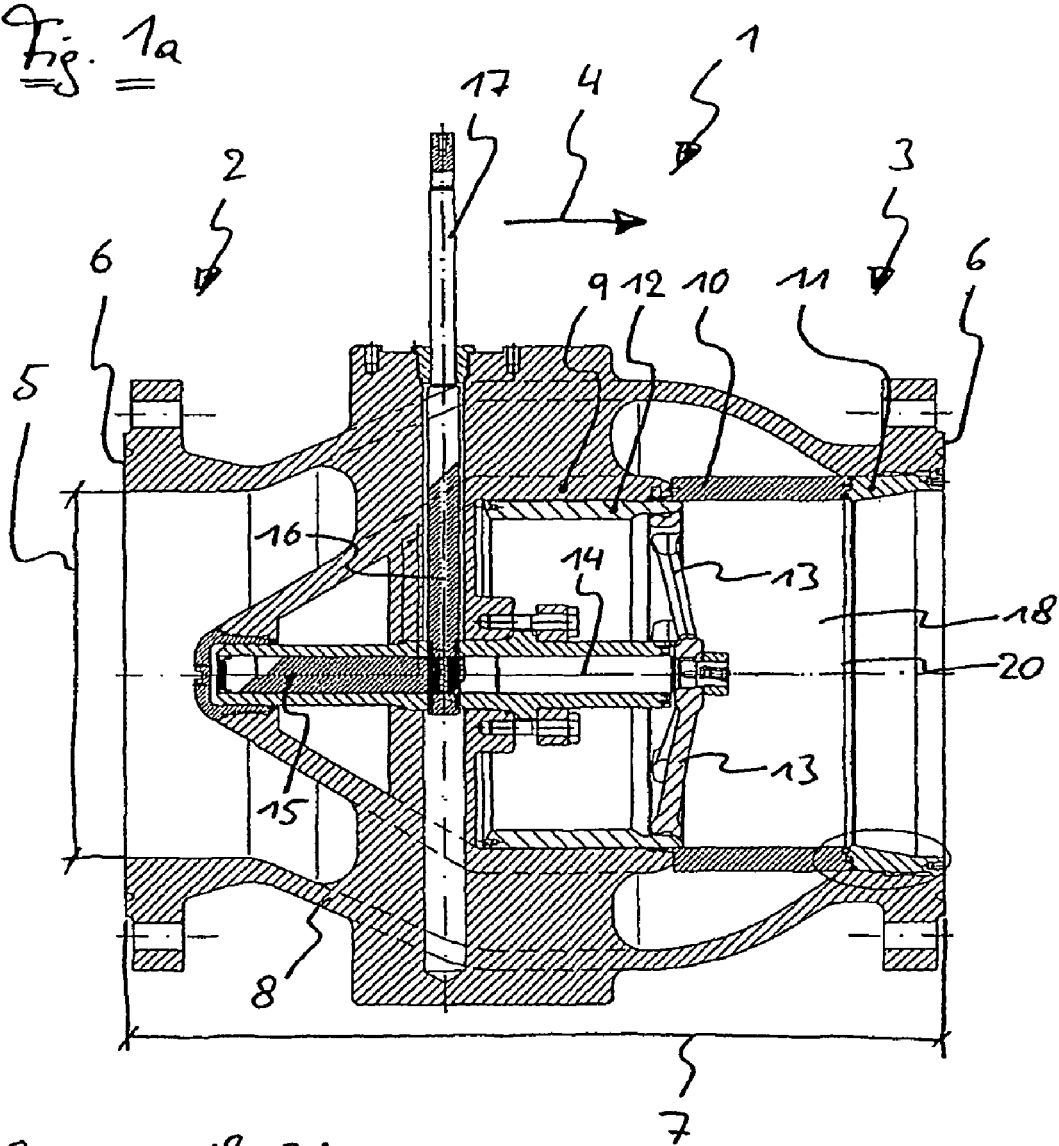
FIG. 1a shows a sectional illustration of a valve having the annular gap seal according to the present invention.
Figure 1B:
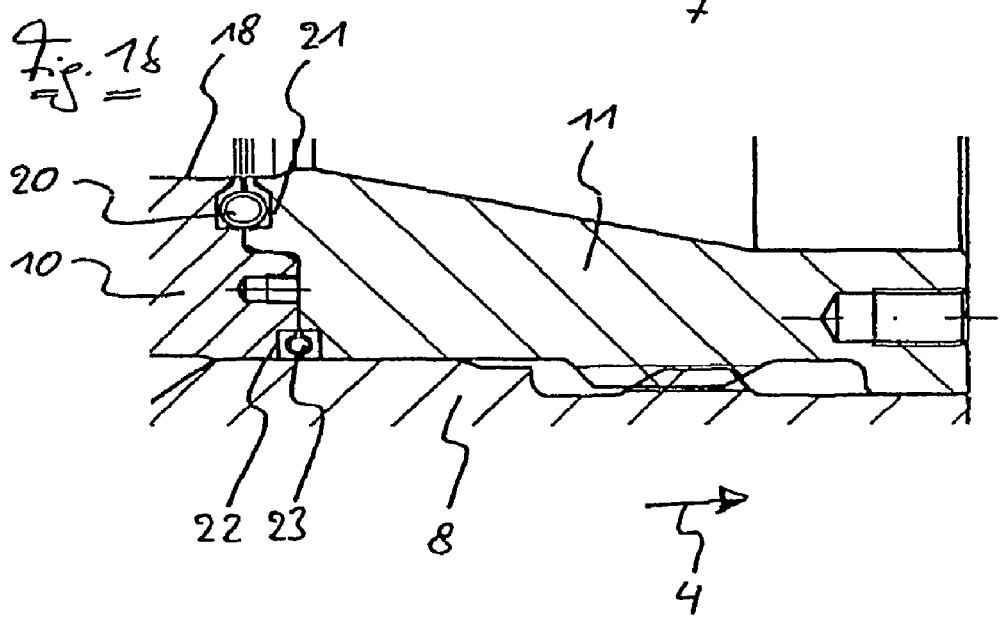
FIG. 1b shows the broader environment of the annular gap seal in this valve.

FIG. 1 shows a valve 1, which regulates the flow of a fluid (not shown) from a valve intake 2 to a valve outlet 3 of the valve 1. The identifications of valve intake 2 and valve outlet 3 relate to the intended flow direction 4 of the fluid through the valve 1, in which maximum flow rates and minimum wear of the valve 1 are implemented in the open position of the valve 1 shown here. The valve 1 shown as an example has a nominal diameter 5 of 24 inches, flange surfaces 6 in accordance with ANSI 900 RTJ for a rated pressure of 900 psi at the valve intake 2 and valve outlet 3, and a total length 7 of 1568 mm between the flange surfaces 6. Valves having identical construction in principle, having nominal diameters between 2 and 48 inches for rated pressures of 150 to 2500 psi, are used for flow regulation of oil, gas, or water or of multiphase mixtures. Alternatively, the valve may also be implemented according to the API standard.

The valve 1 has a cylinder 9, which the fluid may flow through, in a cast housing 8. The fluid penetrates radially through a section implemented as a cage 10 into the cylinder 9 and leaves it—and the valve 1—in the intended flow direction 4. The cage 10 is fixed in the housing 8 using a type of locknut in the outlet bush 11 of the cylinder 9 screwed into the housing 8 of the valve 1.

A piston 12 is axially displaceable in the cylinder 9. The piston 12 has no front face and is permanently connected to an axially running piston rod 14 using radially running spokes 13. The piston rod 14 has a planar surface 15 spiral geared at 45°, which engages with a planar surface 16, which is also spiral geared at 45° of a radially running and radially displaceable switch rod 17. A linear radial movement of the switch rod 17 thus directly causes a linear axial movement of the piston rod 14 without hysteresis and play and therefore allows exact positioning of the piston 12 in the cylinder 9.

The piston 12, the piston rod 14, and the switch rod 17 are in force equilibrium in every operating position. Independently of the applied pressure ratios, the valve 1 is switchable unrestrictedly, and the speed of the switching procedure is restricted on the part of the valve 1 solely by the mass inertia of the piston 12, the piston rod 14, and the switch rod 17. Upon displacement of the piston 12 in the cylinder 9, its mantle surface 18 closes the openings (not shown) in the cage 10 and thus blocks the flow of the fluid through the valve 1 in the blocked position. In the blocked position, the annular gap 19 remaining between the mantle surface 18 of the piston 12 and the cylinder 9 is sealable using an annular gap seal 20. The cylinder 9 in the blocked position and the annular gap 19 to the cylinder 9 formed in this position are exclusively shown in the detail view 4b and 4c.

The annular gap seal 20—as shown in detail views 1b and 1c—lies in a peripheral groove 21 of the cylinder 9, which is implemented between the cage 10 and the outlet bush 11. Using a lip seal 23 positioned in a second groove 22 between the cage 10 and the outlet bush 11, these elements are sealed in relation to the housing 8.

The annular gap seal 20, which is shown in FIG. 2 in a profile section like an exploded drawing, comprises an inner sealing ring 24—in relation to the valve 1—and a mirror-symmetric outer sealing ring 25. Both rings 24, 25 are made of polypropylene and their shapes are stablized using a stabilizng element 26. Each sealing ring 24, 25 has a sealing lip 27, which may be pressed fluid-tight on the mantle surface 18 of the piston 12 in the blocked position. A C-profile 28 adjoins the sealing lip 27, whose outer sealing surface 29 is tailored to the shape of the lateral groove wall 30 and may be pressed fluid-tight thereon. The C-profile 28 forms a sealing shoulder 31 below the sealing lip 27, which is tailored to the shape of a peripheral lug 32, which projects axially into the groove 21 and may be pressed fluid-tight thereon. The C-profile 28 ends in a lower sealing edge 33, which may be pressed against the groove base 34 of the groove 21.

Figure 3A:
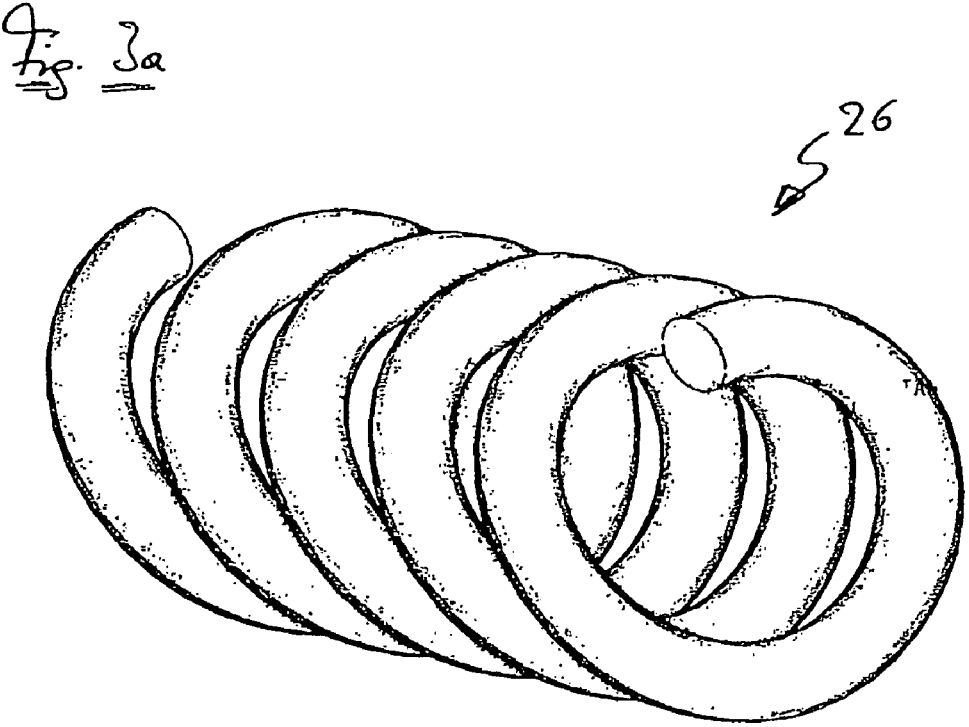
FIG. 3a shows the stabilizing element of the annular gap seal.
Figure 3B:
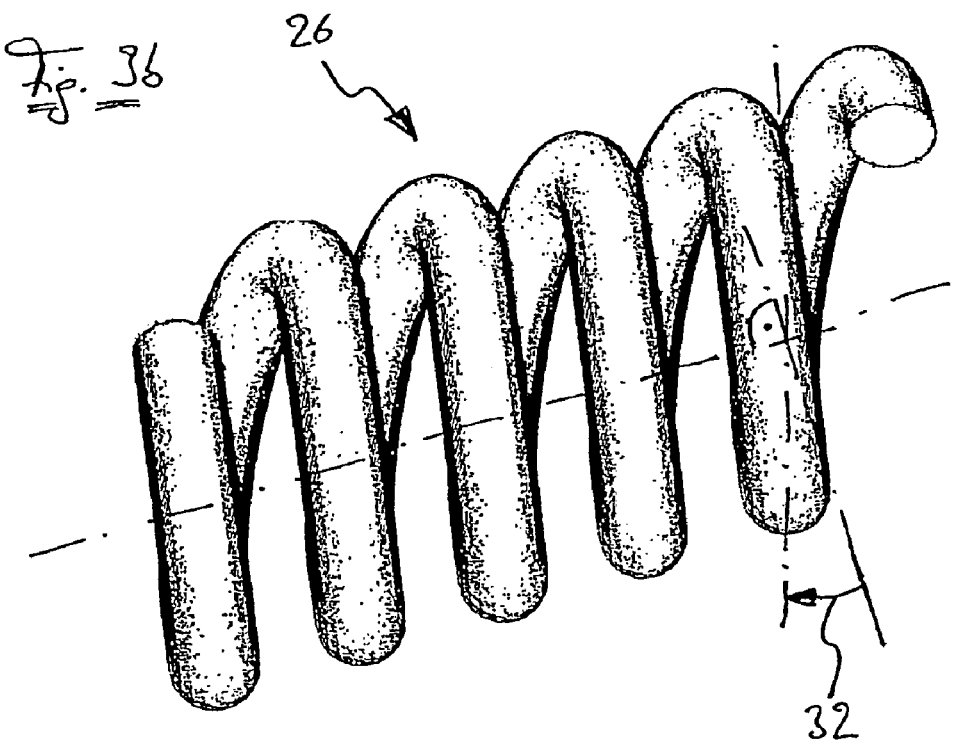
FIG. 3b shows a further view of the stabilizing element.

The stabilizing element 26, in the form of a toroidally curved coiled spring, is laid between the C-profiles 28 of the sealing rings 24, 25. The threads of the coiled spring are—as shown in FIGS. 3a and 3b-slanted by an angle 35 of approximately 10° in relation to the longitudinal axis 36 of the coiled spring. The coiled spring may therefore be laid radially (in relation to the piston 12) compressed between the sealing rings 24, 25, through which a pre-tension of the sealing rings 24, 25 in the radial direction is produced. A support ring S, which is only illustrated in FIGS. 1c and 2, is laid in the coiled spring for mounting purposes.

As shown in FIG. 4a, the sealing lips 27 project slightly out of the groove 21 when valve 1 is open—just far enough that they come into contact with the mantle surface 18 of the piston 12 in the blocked position and close the annular gap 19 between the mantle surface 18 of the piston 12 and the cylinder 9. In the blocked position—illustrated in FIGS. 4b and 4c—any increase of the differential pressure between valve intake 2 and valve outlet 3 of the valve 1 causes self-reinforcement of the sealing effect of the annular gap seal 20.

FIG. 4b shows the pressure at the valve intake 2 is higher than at the valve outlet 3 in the blocked position. This is—in the intended flow direction 4—the normal case: in relation to the particular pressures, the high-pressure side 37 is at the valve intake 2 and the low-pressure side 38 is at the valve outlet 3. A pressure gradient forms between the sealing rings 24, 25: an average pressure lying between the pressure on the high-pressure side 37 and the pressure on the low-pressure side 38 initially forms in the intermediate space 39 between the C-profiles 28.

Under the influence of the particular applied pressure differential, the sealing rings 24, 25 deform. The inner sealing ring 24 (1) is radially compressed by the pressure of the high-pressure side 37, which is higher than the average pressure, (2) temporarily presses against the stabilizing element 26, and (3) eases the pressure equalization between the high-pressure side 37 and the intermediate space 39 between the C-profiles 28 through the annular gap 19, which is thus enlarged. The outer sealing ring 25 is radially expanded by the average pressure, which is higher than that of the low-pressure side 38—and/or later by the pressure of the high-pressure side 37. Its outer sealing surface 29 presses against the groove wall 30, in particular its sealing shoulder 31 presses against the lug 32 implemented on the groove 21. In addition, the sealing edge 33 of the outer sealing ring 25 is pressed against the groove base 34 with increasing pressure differential. Furthermore, the pressure of the sealing lip 27 of the outer sealing ring 25 on the mantle surface 18 of the piston 12 is elevated by the radial expansion. Overall, the sealing action of the annular gap seal 20 is increased.

FIG. 4c shows the case of a—typically undesired, but usually occurring precisely in the event of rapid switching procedures—backflow against the intended flow direction 4. In relation to the normal case illustrated in FIG. 4b, the high-pressure side 37 is now implemented at the valve outlet 3, and the low-pressure side 38 is implemented at the valve intake 2. Because of the mirror-symmetric construction of the annular gap seal 20, the outer sealing ring 25 is now radially compressed here and the inner sealing ring 24 is radially expanded. The sealing action is thus also increased for the case of a flow against the intended flow direction 4 using the annular gap seal 20.

Although at least one embodiment of the present invention has been shown and described, it is apparent that many changes and modifications may be made thereunto without departing from the spirit and scope of the invention.

LIST OF REFERENCE NUMBERS 1 valve
2 valve intake 3 valve outlet
4 intended flow direction
5 nominal diameter
6 flange surface
7 overall length
8 housing
9 cylinder
10 cage
11 outlet bush
12 piston
13 spoke
14 piston rod
15 surface
16 surface
17 switch rod
18 mantle surface
19 annular gap
20 annular gap seal
21 groove
22 groove
23 lip seal
24 inner sealing ring
25 outer sealing ring
26 stabilizing element
27 sealing lip
28 C-profile
29 sealing surface
30 lateral groove wall
31 sealing shoulder
32 lug
33 lower sealing edge
34 groove base
35 angle
36 longitudinal axis
37 high-pressure side
38 low-pressure side
39 intermediate space
S support ring

What is claimed is:

1. A combination valve, piston, cylinder and annular gap seal, said annular gap seal blocking a flow of a fluid from a high-pressure side to a low-pressure side of the valve in a blocked position, the valve having said cylinder which the fluid may flow through and in which said piston is axially displaceable, and an annular gap between the piston and the cylinder being sealable in the blocked position using the annular gap seal, which lies in a peripheral groove of the cylinder, the groove having a peripheral lug that projects toward a middle plane of the groove on both sides, said lug having an interior surface facing the groove that is upwardly inclined from a wall of the groove toward the middle plane of the groove, two sealing rings positioned mirror-symmetrically next to one another in the groove being provided, said sealing rings having a shoulder corresponding to a shape of the inclined surface of the lug and contacting the lug in an area where the lug is inclined, and a sealing surface of a first sealing ring facing toward the low-pressure side being able to be pressed fluid-tight against the groove wall by the fluid from the high-pressure side in the blocked position, wherein, in the blocked position, the sealing shoulder of the first sealing ring facing toward the low-pressure side may be pressed fluid-tight against the peripheral lug, which projects into the groove toward the central plane of the groove, and a sealing lip of the first sealing ring facing toward the low-pressure side may be pressed fluid-tight against the piston by the fluid from the high-pressure side.

2. A combination valve, piston, cylinder and annular gap seal, according to claim 1, wherein the sealing rings have a C-profile and the C-profile of the first sealing ring facing toward the low-pressure side is expandable in the blocked position by the fluid from the high-pressure side.

3. A combination valve, piston, cylinder and annular gap seal, according to claim 1, comprised of oversized dimensions in relation to the distance between piston and groove base, so that the annular gap seal may be laid in the groove with pre-tension.

4. A combination valve, piston, cylinder and annular gap seal, according to claim 1, comprised of stabilizing element which may be laid in the direction of the groove with the sealing rings.

5. A combination valve, piston, cylinder and annular gap seal, according to claim 4, wherein the sealing rings may be pre-tensioned radially in the direction of the piston using the stabilizing element.

6. A combination valve, piston, cylinder and annular gap seal, according to claim 1, wherein the stabilizing element is a coiled spring which may be inserted in a torus shape.

* * * * *